July 11, 1961  K. KIRSCH ET AL  2,991,893
CONVEYOR SYSTEMS

Filed Dec. 22, 1958  3 Sheets-Sheet 1

FIG. I.

INVENTORS
Kurt Kirsch &
Otto Weinreich

BY *George K. Spencer*

ATTORNEY

INVENTORS
Kurt Kirsch &
Otto Weinreich

Inventors:
Kurt Kirsch & Otto Weinreich

United States Patent Office 2,991,893
Patented July 11, 1961

2,991,893
CONVEYOR SYSTEMS
Kurt Kirsch and Otto Weinreich, Konstanz (Bodensee), Germany, assignors to Telefunken G.m.b.H., Berlin, Germany
Filed Dec. 22, 1958, Ser. No. 781,997
Claims priority, application Germany Dec. 20, 1957
7 Claims. (Cl. 214—11)

The present invention relates to conveyor systems and, more particularly, to conveyor systems for transporting a plurality of small, light objects.

In the past, conveyor systems used mechanical switches for changing the direction of movement of the articles being conveyed, but higher distribution rates may be achieved if mechanical structures with movable parts having comparatively high inertia are avoided. This invention, while primarily useful in the conveying of letters, sheets, papers, or other sheet-like objects, is also applicable to the distribution of other articles or goods which may be transported by conveyor belts supported between rollers, or which may be moved by their own mass, as in an air stream.

Switching devices, such as tongs or blades, have been used in systems where goods must be transferred from one track to another, the tong or blade switches being operated by mechanical or electrical means at the appropriate times to effect the proper guidance of the items from one channel into another. In some conveyor systems, the goods are urged into branch channels by the mechanical displacement of the rollers.

In any of these systems, the actual control of the channels along which the materials are conveyed may be under the control of any of a number of means, such as magnetic tapes, punched cards, photo electric scanning of contours, or by the operation of coded symbols on the items themselves.

At present, and prior to this invention, the main objection to the known switches was the great masses which must be moved and the large amount of energy and time required to move the masses. As a result, the rate of flow of material is at present limited, for example, in the case of mail, to less than 20,000 letters per hour, and this figure is approximated only if all conditions are favorable.

It is, therefore, an object of the present invention to provide a new and improved conveyor switch which operates at high speed.

It is another object of this invention to provide a new and improved conveyor switch so constructed that the inertia and the operating forces required are comparatively small.

It is a further object of this invention to provide a switch for conveyor systems, said switch incorporating few moving parts and suffering very little from wear.

It is still another object of this invention to provide a switch for conveyor installations in which goods are diverted by pulsed changes in pressure between one conveyor and another.

It is another object of this invention to provide nozzles adjacent the branching of the conveyor channels. The nozzles, connected to sources of gas under pressure or at partial vacuum, control the diversion of material from the stream of travel by the opening of the nozzles for a short interval, creating an impulse jet.

It is yet another object of this invention to provide at least one nozzle adjacent each branch and, where items having large surfaces are to be conveyed, a plurality of nozzles at each branch, all nozzles being connected to the same source of gaseous pressure or vacuum. In the case of a plurality of nozzles at a single branch, one nozzle is usually placed slightly in advance of the branch and another at the actual branch itself. In this way, positive deflection of items is assured.

It is an additional object of this invention to provide on one side of a conveyor stream nozzles having a positive pressure action, and on the other side of the same conveyor stream, nozzles having a negative pressure action. Thus, a gas pressure may be exerted on one side of a conveyor, while a gas vacuum is exerted at the same time on the other side.

It is preferable to have the junctions of the channels, and especially the entrance of a branch channel, coneor funnel-shaped to more readily receive objects deflected thereinto. Since the act of diverting an object from one channel into another tends to brake the object and slows it down, it is desirable to have the deflectible guides rounded and free of edges which can catch and completely stop the objects. The addition of rollers to the junction of the channels may reduce the incidence of halted items, especially, when the rollers have a rotational speed from 10% to 30% higher than the other portions of the conveyor system. Proper location of the rollers is in the path of the deflected objects, where they are forced against the rollers upon deflection, thereby receiving a driving impulse. The effect of the rollers may be assured if their surfaces are roughened for good gripping. In place of rollers, rotating belts, against which deflected articles are forced upon rerouting, may be used.

By using pairs of rollers, rotating in opposite directions at the entrance to a branch channel, the positive catching and movement of deflected articles is assured, and they will be suitably accelerated by the rollers acting in concert. At the same time, the pairs of rollers may serve as the starting conveyors for the branch track.

Instead of the single fork considered above, where a single branch is taken from a main channel at any point, it is also possible to provide a branch channel on either side (or on both sides) of the main channel at any point. In fact, a plurality of channels may branch from one main channel closely adjacent each other and thus provide greater versatility in the system.

Tests have shown that, for the proper deflection of ordinary letter mail, compressed air impulses of from $\frac{1}{50}$ to $\frac{1}{10}$ of a second duration are sufficient if the air nozzles are properly designed. Although there are many known nozzle shapes, the type generally designated "Lavalle" is the one most preferred for this invention, because in that type of nozzle, the volume flow of air is most readily converted into velocity with a low noise level. The valves controlling the flow of compressed air to the nozzles may be manually controlled either directly or by electrical means, suitably connected to manual switches. However, such operation is ordinarily not sufficiently rapid for the uses to which such conveyor systems are placed, and automatic control of the valves is preferred. Such automatic control may be, as mentioned above, by means of magnetic tape, punched cards, or the sensing of information impressed upon the articles being conveyed. The valves may be electromagnetically operated.

In the simplest form of this invention, the items being transported over a conveyor will either continue on the original channel or be diverted to a branch by the action of a control pulse at the proper time.

In the following description, conveyor paths will be designated channels and their structure is not a part of this invention. The channels may be formed as open or grooved troughs in which the materials to be moved are carried by their own weight or by means of a moving medium. They may also comprise mechanically driven belts bordered by smooth side walls or guide rails. Or, the conveyor channels may comprise stationary rails on which the items are moved by means of mechanically driven belts bordering the rails, the belts acting on either or on both sides of the items. The switch of this invention will operate properly in any of these structures or in a system of pressure rolls disposed one behind the other.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 schematically illustrates in perspective a single branch of a conveyor system incorporating the principles of this invention;

In the drawings, like reference characters designate the same or like parts in the several figures.

Figure 1:
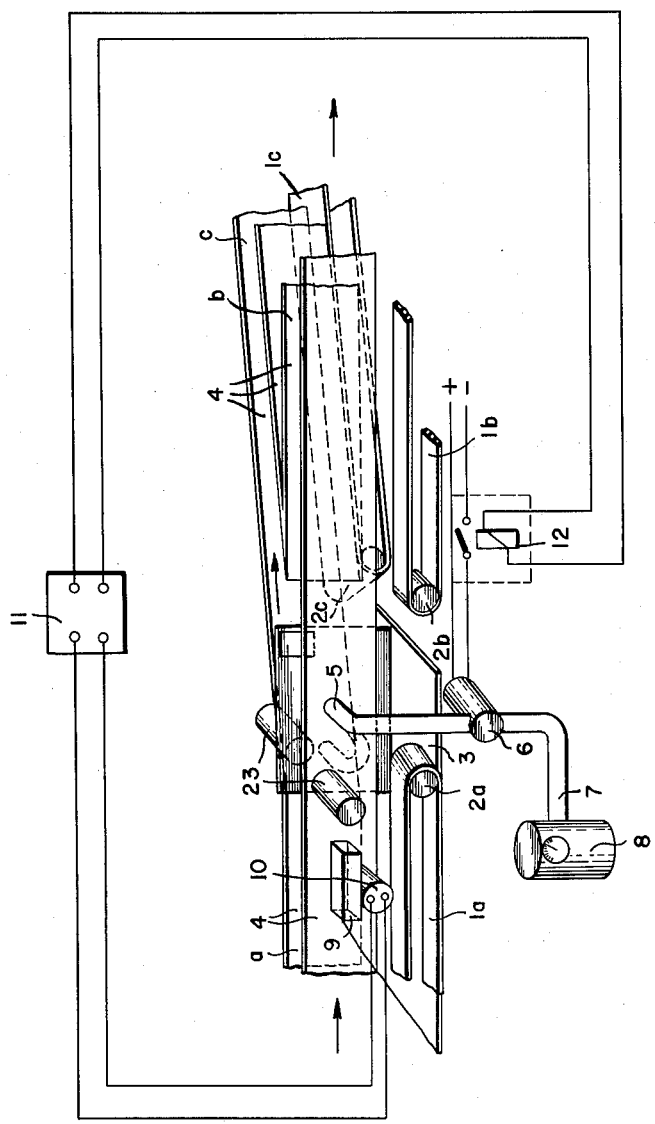

Referring in more detail to the drawings and, more particularly, to FIGURE 1, the reference character a designates the channel which receives the conveyed articles, letter mail for this explanation, b designates the portion of the channel which continues in the same direction as that designated by a after a branch channel c to which selected letters are to be deflected. Letters are received in channel a and conveyed therealong in an upright position and are moved by belts 1a, 1b and 1c which, in turn, are supported on rollers 2a, 2b and 2c. At the junction of the main and the branch channels, the letters slide upon a stationary surface 3. Fixed side walls 4 guide the letters in their movements through the channels a, b and c and maintain them in the upright position. A gas nozzle 5 is inserted in an opening in the side wall 4 opposite the point at which the channel c branches from the main channel a. Of course, in place of the single nozzle 5, two or more nozzles next to each other may be used. Such an arrangement is shown in FIGURE 1 in dotted lines. The nozzles 5 are connected by a suitable tube 7 to a source of compressed gas, such as compressed air tank 8. An electromagnetically operated valve 6 may be inserted in the pipe 7 to control the flow of air from the tank 8 to the nozzle 5. The valve 6 is connected to a source of electrical energy (not shown) through the contacts of a relay 12, energy being supplied to the coil of the relay 12 from an amplifier 11 which is controlled by the output of a photosensitive device 10. Radiant energy is supplied from a source of ultraviolet light 9 which is arranged to irradiate letters passing along the main channel a.

In operation, the letters being fed along the channel a pass the light source 9. These letters have been encoded by means of a color fluorescing material which converts the radiant energy from the source 9 into energy of a wave length to which the photosensitive member 10 responds. Upon the detection of a letter bearing the appropriate coded markings, the photosensitive device 10 generates an output pulse which is amplified by the amplifier 11 and is fed to the relay coil 12. This actuates the contacts of the relay 12 to operate the switch 6 and allow a pulse of compressed air to pass from the nozzle 5. The letter is then deflected into channel c by the sharp blast from the nozzle 5.

However, any letter passing the sensing cell 10 without an appropriate mark thereon does not actuate the deflection mechanism and continues on its way past the junction of the channel c and into the channel b. Since the detection means must be placed at a point in advance of the nozzle 5, a suitable delay must be inserted into the system to ensure that the air blast strikes the letter at the proper time. This delay may be achieved by any known means, such as by an electrical delay inserted between the amplifier 11 and the relay 12. An inherent delay exists in the system, due to the time required for the relay 12 and the valve 6 to respond. However, additional time delays may be required and it is desirable to incorporate delay means which are adjustable within limits, so that the final time of operation of the jet pulse can be adjusted to strike the letter at the most desirable point. One manner of operation to insure a proper delay is the storage of the signal generated by the photosensitive device 10 in a device which releases it upon receipt of a second signal generated by the leading edge of the letter as it reaches a detector 23. A letter not bearing a code sign will not cause the generation of a signal in the photosensitive device 10 and will not be deflected from its original direction.

The operation just described contemplated the use of a simple binary code which determined whether the individual letter was or was not deflected from its path of travel. In place of the simple binary code, more complex and versatile codes may be used to control a plurality of branch channels past which each letter must move. The number of channels branching off the main channel at or near an individual location may be increased by adding them to either one or both sides of the main channel. In addition, instead of the optical system of control described, it is also possible to use a magnetic system of control. It is not necessary to apply the control information directly to the article being conveyed. For example, the forward velocity of the letters is known and maintained substantially constant, and it is possible to move a tape adjacent to the channel and in synchronism with the articles in the channel. Thus, the magnetic tape bearing coded deflection information may be driven along with the letters in the channel and the tape sensed at the appropriate locations to ensure the proper deflection of the letters. Although the code and control apparatus thus required may be more complex than the one described, known coding and reading techniques may be used.

Figure 2:
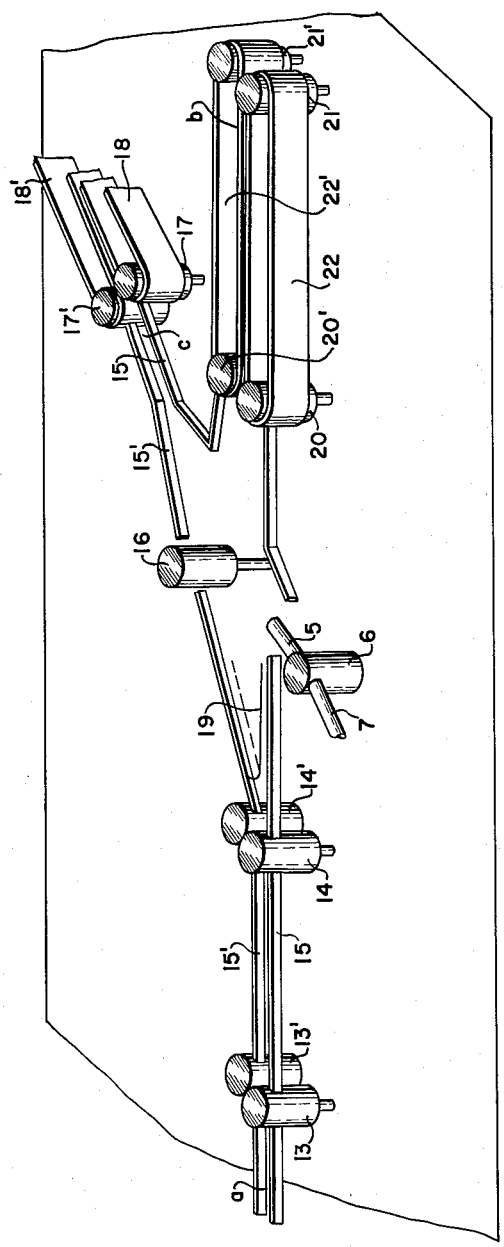
FIGURE 2 shows, in perspective, a modification of the branch of the conveyor system of FIGURE 1, utilizing the principles of this invention.

In the modification of the apparatus illustrated in FIGURE 2, the letters are conveyed along a main channel a by means of oppositely rotating rollers 13—13' and 14—14'. One roller of each pair is mounted on one side of the channel a at openings in the guide rails 15—15', said openings being spaced at distances such, that any letter will always be gripped by a pair of rollers. The external surfaces of the rollers are designed with soft elastic or resilient material which adapts to the varying thickness of the different letters passing therebetween. The apparatus is shown in FIGURE 2 with guide rails at the entrance to the branch channel c being widened at the junction with the main channel a to ensure proper deflection into the branch.

A nozzle 5, connected through a valve 6 to a supply pipe 7, is positioned in an interruption in the guide rails 15—15' opposite the mouth of the branch channel c. A single roller 16 rotating at a peripheral speed of from 10% to 30% higher than that of the other rollers 13—13' to 21—21' is mounted opposite the nozzle 5 in one side of the mouth of the branch channel c. The blast of air from the nozzle 5, when a letter is to be deflected into the branch channel c, drives the letter against the rapidly rotating surface of the roller 16, accelerating the letter in the direction of the pair of rollers 17—17'. Channel c is formed of moving belts 18—18' supported at one point by each of the rollers 17—17' which also serve to drive the belts. In the same manner, the continuation of the main channel b is also formed of moving belts 22—22' supported at one end by rollers 20—20' and at the other end by rollers 21—21'. However, it is possible to provide the channels b and c with free standing drive rollers and guide rails, just as is channel a.

There is always the possibility that a letter would just fall or be otherwise accidentally deflected and follow the wrong path if the mouth of the branch channel b were left open. To prevent accidents of this nature, a flexible guide spring 19 is provided. The spring 19 is ordinarily stiff enough to prevent any accidental deflection of a letter into the mouth of channel b, but it is also flexible enough to move into the dotted position when a blast of air strikes a letter for intentional deflection along the channel c.

Figure 3A:
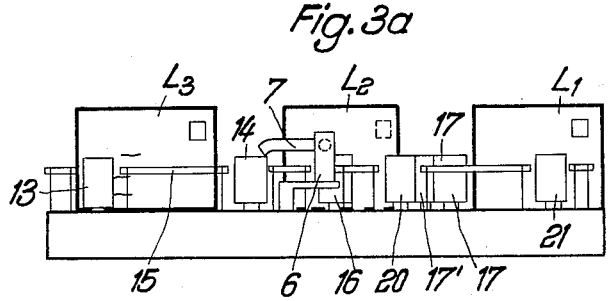
FIGURES 3a and 3b illustrate in elevation and plan view, respectively, a further modification of the basic conveyor branch of FIGURE 1, in accordance with the principles of this invention.
Figure 3B:
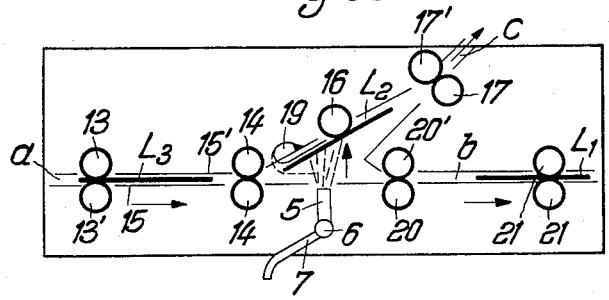

In the embodiment of FIGURES 3a and 3b, the channels a, b and c are formed of guide rails and rollers only. A letter $L_1$ is shown in the channel b having negotiated the junction of the main channel a and the branch channel c without being deflected and is in the grip of opposed rollers 21—21' which move it along to the next pair of rollers. At the same time, a second letter $L_2$ is shown being deflected against the accelerating roller 16 by the action of a gas jet from the nozzle 5. The letter $L_2$ will be passed on to the rollers 17—17' in channel c after its deflection from channel a. FIGURE 3b shows more clearly the action of a deflected letter in bending the guide spring 19 to open the mouth of the branch channel c. A third letter $L_3$ has just entered the main channel a and is being propelled forwards by the action of the drive rollers 13—13' to follow the paths of either letter $L_1$ or letter $L_2$.

Figure 4:
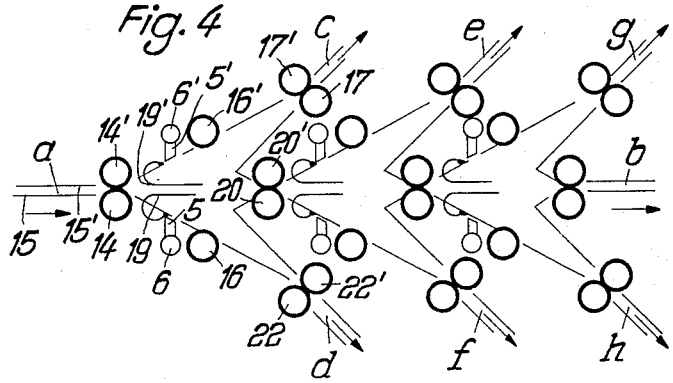
FIGURE 4 shows in plan view another modification of the conveyor system of this invention.

A more complex distribution system, utilizing the principles of this invention, is illustrated in schematic form in FIGURE 4. In this figure, a main channel and several branch channels are shown. The conveyor system, shown by way of example, has stationary side walls 15—15', of guide rails or other suitable forms, with opposed paired rollers serving as letter drive means. A main channel a comprises drive rollers 14—14' immediately prior to the mouths of two branch channels c and d on opposite sides of the main channel a. The main channel is formed of flexible guide members 19 at the mouths of all of the branch channels and, at appropriate locations in one wall of the channel a, a nozzle 5 is situated for deflecting letters into the branch channel c. On the opposite side of the main channel a is another nozzle 5' adapted to deflect letters into the branch channel d. Each nozzle has its own valve 6 or 6' associated therewith for controlling the flow of compressed air to the individual nozzles. After the branch channels c and d, there are branching off the main channel a channels e and f and g and h, one branch channel of each pair being on one side of the main channel, and the other of the pair being on the other side of the main channel. Each branch has its own nozzle and control valve situated adjacent its opposing branch.

A letter entering the channel a between the rails 15—15' is moved by the rollers 14—14' until it is adjacent the mouths of the branch channels c and d. If the letter is intended to be routed into channel d, then the valve 6' is actuated by suitable controls to allow a blast of compressed air to leave the nozzle 5' and deflect the letter. If, however, the letter is either to continue in the direction in which it is travelling, or is to be deflected into distribution chanels e, f, g, or h farther along, then it is guided by the flexible rails 19—19' until it is deflected by the action of a subsequent nozzle. The operation of the rollers 16—16' is, as explained above, to accelerate the letter in its new path and to aid in the guiding of the letter as it enters the mouth of the branch channel. From this, it can be seen that any number of branch channels and many forms of construction for the individual channels are possible in accordance with this invention.

We claim:

1. A conveyor system for the transportation of discrete articles, said system comprising a first main channel along which articles are conveyed, at least one branch channel connecting to said main channel for receiving articles to be deflected from said main channel, and means for deflecting selected articles from said main channel into a selected branch channel, said deflection means comprising at least one nozzle situated adjacent and associated with each junction of a branch channel with said first channel for creating a blast of gas against an article to be deflected, a source of compressed gas, and means for selectively connecting said nozzle to said source of compressed gas in response to the arrival of an article to be deflected at the associated junction, said system further including a rotating member situated in the junction of each of said branch channels for accelerating articles deflected against it toward the associated branch channel, each junction of said first channel with a branch channel comprising a widened mouth at the branch channel, and readily deflectible guide members forming in their normal positions article guide means along said first channel across at least a portion of the mouth of each branch channel, whereby an article being deflected from said first channel into a branch channel by a blast of gas causes said deflectible guide members to yield, opening the mouth of said branch channel to the ready passage thereinto of said deflected article.

2. The system defined in claim 1, wherein said branch channels join said first channel on only one side of said first channel.

3. The system defined in claim 1, wherein said branch channels join said first channel on both sides of said first channel.

4. The system defined in claim 1 and including rotating article drive members in each channel, said rotating member having a surface formed of material with a high coefficient of friction to ensure ready acceleration of articles deflected against it and said rotating member having a peripheral velocity from 10% to 30% higher than the peripheral velocity of other article drive members.

5. The system defined in claim 1, wherein article detection means are provided responsive to coded symbols on said articles being conveyed, and said detection means being connected with said means for connecting said nozzles to said source and controlling the flow of gas therethrough.

6. The system defined in claim 1, wherein article detection means are provided responsive to coded information on a member moving synchronously with said articles, and said detection means being connected with said means for connecting said nozzles to said source and controlling the flow of gas therethrough.

7. A system as defined in claim 1, further comprising detection means responsive to the arrival of an article to be deflected at each junction of said first channel and a branch channel to generate a signal, and valve means connected with said means for connecting said nozzles to said source and responsive to a signal generated by said detection means for allowing compressed gas to pass through said nozzles for a short length of time.

References Cited in the file of this patent

UNITED STATES PATENTS

| | | |
|---|---|---|
| 1,217,092 | Hopp | Feb. 20, 1917 |
| 2,476,371 | Haumann | July 19, 1949 |
| 2,719,629 | Robinson | Oct. 4, 1955 |
| 2,889,941 | Mehlis | June 9, 1959 |

FOREIGN PATENTS

| | | |
|---|---|---|
| 359,196 | Italy | May 16, 1938 |